United States Patent
Lindner et al.

(10) Patent No.: US 10,958,711 B1
(45) Date of Patent: Mar. 23, 2021

(54) PLATFORM TO DELIVER ENTERPRISE CLOUD RESOURCES AND SERVICES USING COMPOSABLE PROCESSES

(71) Applicant: Virtustream IP Holding Company LLC, Bethesda, MD (US)

(72) Inventors: Maik A. Lindner, Marietta (GA); Vincent G. Lubsey, Davenport, FL (US); Eloy F. Macha, Las Cruces, NM (US); Sean C. O'Brien, Atlanta, GA (US); Eduardo M. Rosa, Marietta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 387 days.

(21) Appl. No.: 15/798,724

(22) Filed: Oct. 31, 2017

(51) Int. Cl.
*H04L 29/08* (2006.01)
*H04W 84/18* (2009.01)
(Continued)

(52) U.S. Cl.
CPC ............ *H04L 67/10* (2013.01); *G06F 9/5072* (2013.01); *G06Q 10/06* (2013.01);
(Continued)

(58) Field of Classification Search
CPC ........ G06F 9/50; G06F 9/5005; G06F 9/5011; G06F 9/5016; G06F 9/5027;
(Continued)

(56) References Cited

U.S. PATENT DOCUMENTS

| 10,262,019 B1 | 4/2019 | Reiner et al. |
| 10,581,675 B1 * | 3/2020 | Iyer .................. H04L 67/10 |

(Continued)

OTHER PUBLICATIONS

Buyya, Rajkumar, Suraj Pandey, and Christian Vecchiola. "Cloudbus toolkit for market-oriented cloud computing." IEEE International Conference on Cloud Computing. 2009. pp. 24-44 (Year: 2009).*

(Continued)

*Primary Examiner* — Vivek Srivastava
*Assistant Examiner* — William C McBeth
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least a first cloud-based system. The processing platform further comprises one or more integration adapters configured to implement multiple cloud resources onto the processing platform, a cloud services module configured to deploy one or more identified cloud services onto the processing platform, a processes module configured to deploy one or more identified business processes and one or more identified technical processes onto the processing platform, and an integration middleware configured to automate ad hoc execution of at least one of the one or more cloud services, the one or more business processes, and the one or more technical processes, in conjunction with at least one of the implemented cloud resources.

20 Claims, 10 Drawing Sheets

(51) Int. Cl.
   *G06Q 10/06* (2012.01)
   *H04L 12/24* (2006.01)
   *G06F 9/50* (2006.01)
(52) U.S. Cl.
   CPC .......... *H04L 41/5096* (2013.01); *H04L 67/02* (2013.01); *H04L 67/1076* (2013.01); *H04W 84/18* (2013.01)
(58) Field of Classification Search
   CPC .... G06F 9/5061; G06F 9/5072; G06F 9/5077; H04L 41/08; H04L 41/0806; H04L 41/0876; H04L 41/0886; H04L 41/0889; H04L 41/5041; H04L 41/5048; H04L 41/5051; H04L 41/5054; H04L 41/5096; H04L 67/10; H04L 41/5064
   See application file for complete search history.

(56) References Cited

U.S. PATENT DOCUMENTS

| | | | |
|---|---|---|---|
| 2008/0306798 A1 | 12/2008 | Anke | |
| 2011/0138050 A1* | 6/2011 | Dawson | G06F 9/5072 709/226 |
| 2011/0238458 A1 | 9/2011 | Purcell | |
| 2011/0265081 A1* | 10/2011 | Lucovsky | G06F 9/5072 717/177 |
| 2012/0005236 A1* | 1/2012 | Deng | G06F 9/5072 707/798 |
| 2012/0016778 A1* | 1/2012 | Salle | G06F 9/5072 705/27.1 |
| 2012/0147894 A1* | 6/2012 | Mulligan | H04L 41/5048 370/395.53 |
| 2012/0239739 A1* | 9/2012 | Manglik | G06F 9/5077 709/203 |
| 2013/0066940 A1* | 3/2013 | Shao | H04L 67/1025 709/201 |
| 2013/0173918 A1* | 7/2013 | Saraswat | H04L 41/02 713/167 |
| 2013/0191218 A1 | 7/2013 | Predescu | |
| 2013/0232463 A1* | 9/2013 | Nagaraja | G06F 8/61 717/101 |
| 2013/0263209 A1* | 10/2013 | Panuganty | H04L 43/08 726/1 |
| 2014/0143422 A1* | 5/2014 | Joseph | G06F 9/5077 709/226 |
| 2014/0278623 A1* | 9/2014 | Martinez | H04L 41/5096 705/7.12 |
| 2014/0337429 A1 | 11/2014 | Asenjo | |
| 2016/0065417 A1* | 3/2016 | Sapuram | H04L 41/5096 709/223 |
| 2016/0337175 A1* | 11/2016 | Rao | H04L 41/5051 |
| 2018/0095778 A1 | 4/2018 | Aydelott et al. | |
| 2018/0131583 A1* | 5/2018 | Barrows | H04L 41/5051 |
| 2018/0331928 A1* | 11/2018 | Dave | H04L 67/10 |
| 2019/0012149 A1* | 1/2019 | Garza | G06F 9/50 |
| 2019/0036789 A1 | 1/2019 | Kaplunov et al. | |

OTHER PUBLICATIONS

E. Hormozi, H. Hormozi, M. K. Akbari and M. S. Javan, "Using of Machine Learning into Cloud Environment (A Survey): Managing and Scheduling of Resources in Cloud Systems," 2012 Seventh International Conference on P2P, Parallel, Grid, Cloud and Internet Computing, Victoria, BC, 2012, pp. 363-368 (Year: 2012).*
Wikipedia, Business Process Model and Notation (BPMN), https://en.wikipedia.org/w/index.php?title=Business_Process_Model_and_Notation&oldid=804950746, Oct. 12, 2017.
Wikipedia, BPEL (Business Process Execution Language), https://en.wikipedia.org/w/index.php?title=Business_Process_Execution_Language&oldid=786392224, Jun. 19, 2017.
Wikipedia, Event-driven process chain (EPC), https://en.wikipedia.org/w/index.php?title=Event-driven_process_chain&oldid=771078397, Mar. 19, 2017.
Wikipedia, Architecture of Integrated Information Systems, https://en.wikipedia.org/w/index.php?title=Architecture_of_Integrated_Information_Systems&oldid=782492788, May 27, 2017.
Wikipedia, AWS Lambda, https://en.wikipedia.org/w/index.php?title=AWS_Lambda&oldid=790050312, Jul. 11, 2017.

* cited by examiner

FIG. 7A

```
public class CRP service {
    public string name = 0;
    public string description = 0;
    public int price = 0;
    public int address = 0.0.0.0;

//constructor
    public service(string name "virtual machine", string description "virtual machine with 128MB RAM, 4 core CPU and 400 IOPS", int price 100, int address 128.0.0.1) {
    name = "virtual machine";
    description = "vm with 128MB RAM, 4 core CPU and 400 IOPS";
    price = 100;
    address = 128.0.0.1;
    }
}
```

CONTINUED FROM FIG. 7A

```
{
    "$schema": "incorporate virtual machine service into CRP supply chain flow",
    "contentVersion": "1.0",
    "parameters": {

"<parameter-name>": {
                "type": "virtual machine",
                "defaultValue": standard VM,
            }
        },
    "triggers": [ { "trigger-name": {

"type": CRP VM optimization,
                    "inputs": { settings },
                    "recurrence": {
                        "frequency": "Day",
                        "conditions": [ check VM performance
            and price ],
                }} ], "actions": [ { "get VM IP": {

"type": "IP address",
                "inputs": {
                    "method": "GET",
                    "uri": "VM IP"
                    }
            }} ],
    "outputs": {

"optimized VM": {

"value": "VM address",
            }
        }
}
```

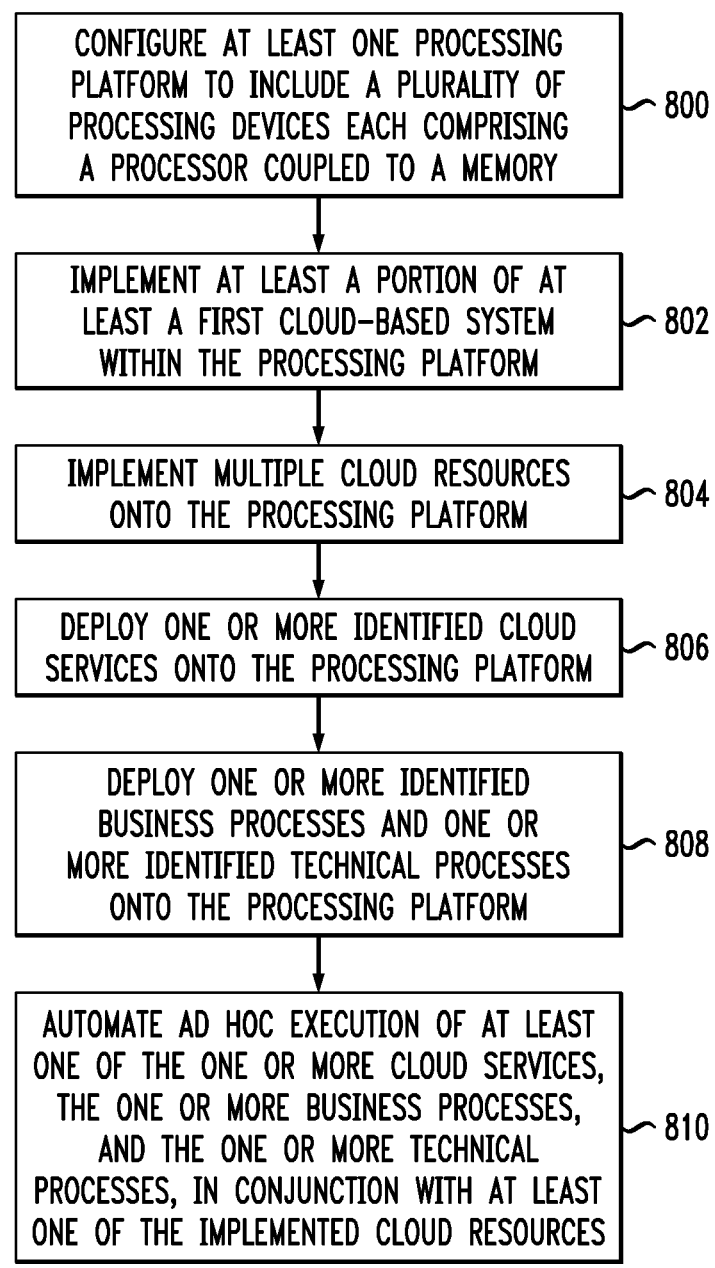

PLATFORM TO DELIVER ENTERPRISE CLOUD RESOURCES AND SERVICES USING COMPOSABLE PROCESSES

FIELD

The field relates generally to information processing systems, and more particularly to techniques for providing cloud services implemented using virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, AMAZON WEB SERVICES (AWS), GOOGLE CLOUD PLATFORM (GCP), and MICROSOFT AZURE. Despite the widespread availability of these and numerous other private, public and hybrid cloud offerings, there exists a significant problem in conventional practice in that there is no adequate mechanism available for planning, executing and optimizing cloud resources and cloud services in a coherent manner across multiple service providers within a single cloud infrastructure to establish a comprehensive end-to-end process in conjunction with both business and technical aspects of an enterprise.

SUMMARY

Illustrative embodiments of the present invention provide information processing systems configured to deliver enterprise cloud resources and services using composable business and technical processes.

In one embodiment, an apparatus comprises a processing platform that includes a plurality of processing devices each comprising a processor coupled to a memory. The processing platform is configured to implement at least a portion of at least a first cloud-based system. The processing platform further comprises one or more integration adapters configured to implement multiple cloud resources onto the processing platform, a cloud services module configured to deploy one or more identified cloud services onto the processing platform, a processes module configured to deploy one or more identified business processes and one or more identified technical processes onto the processing platform, an integration middleware configured to automate ad hoc execution of at least one of the one or more cloud services, the one or more business processes, and the one or more technical processes, in conjunction with at least one of the implemented cloud resources.

Illustrative embodiments can provide significant advantages relative to conventional enterprise cloud computing platforms. For example, challenges associated with the limitations of closed and monolithic platforms are overcome through integrating business and technical services provided by an ecosystem of providers, and a platform which allows for orchestration of the services on a common platform and provides the toolbox for a composed service to be provisioned. Such a holistic platform can fulfill the needs of enterprises to leverage the benefits of cloud computing across multiple vendors while providing a single point of entry, a single contractual view, and access to a service portfolio with interconnected service provisioning steps. Also, in addition to compute, network, and storage services, the platform is capable of orchestrating advisory and managed services within an information technology (IT) landscape view to form a single cloud IT system.

These and other illustrative embodiments described herein include, without limitation, methods, apparatus, systems, and computer program products comprising processor-readable storage media.

BRIEF DESCRIPTION OF THE DRAWINGS

FIG. 7A and FIG. 7B (collectively referred to herein as FIG. 7) show example pseudocode for service and workflow definition in an illustrative embodiment.

FIG. 8 is a flow diagram of a process for delivering enterprise cloud resources and services using composable business and technical processes in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
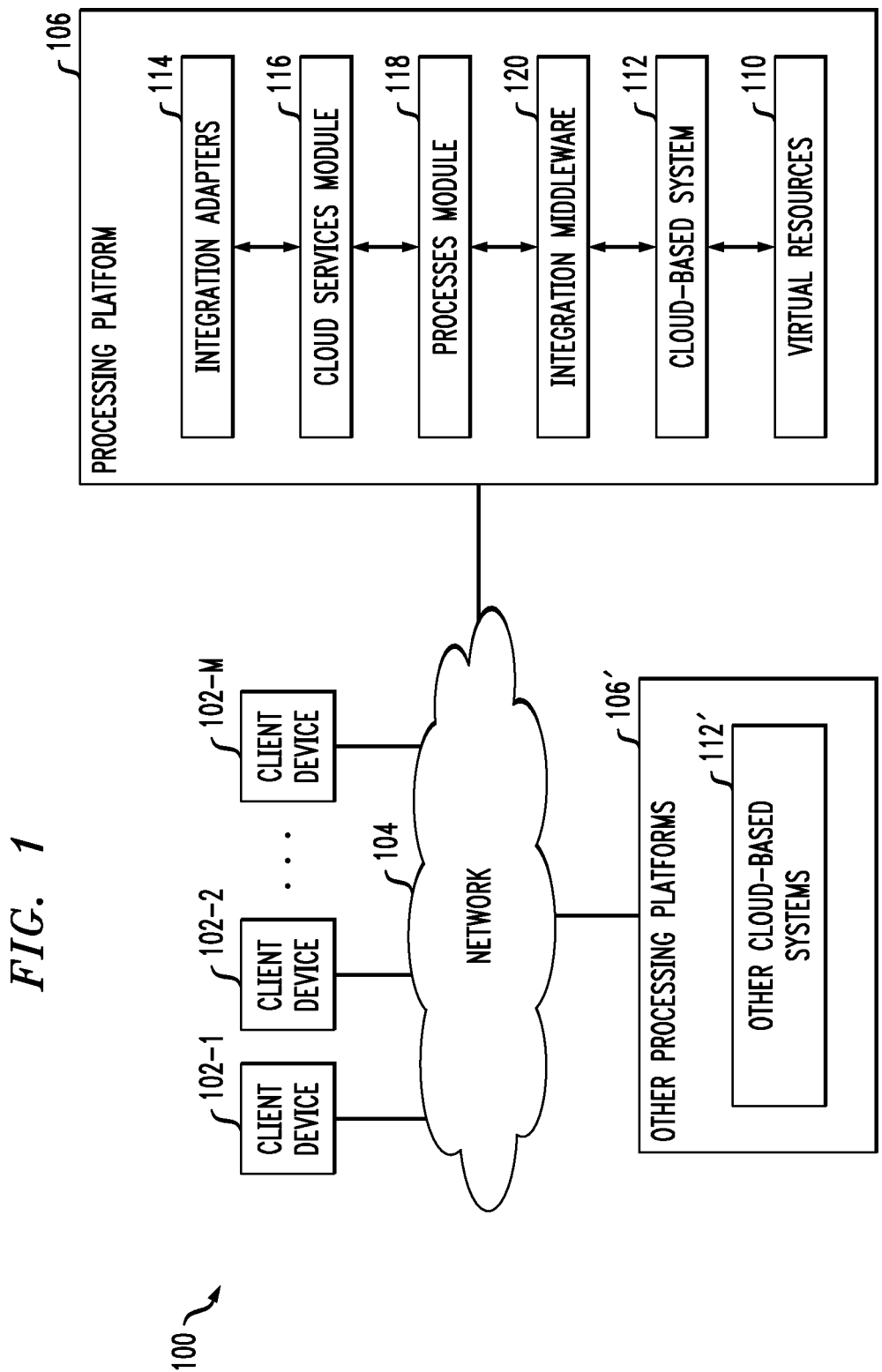
FIG. 1 is a block diagram of an information processing system configured for cloud resource planning in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WI-FI or WIMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises integration adapters 114, a cloud services module 116, a processes module 118 and integration middleware 120, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private cloud aspects and thus may include various combinations of on-premises and off-premises portions, such as on-premises placement of managed appliances that can be consumed on-demand like off-premises cloud capacity, but at the same time offer the benefits of on-premises deployments such as security, compliance and physical control.

The integration adapters 114 are configured to implement multiple cloud resources onto the processing platform 106. The cloud services module 116 is configured to deploy one or more identified cloud services onto the processing platform 106. The processes module 118 is configured to deploy one or more identified business processes and one or more identified technical processes onto the processing platform 106. The integration middleware 120 is configured to automate ad hoc execution of at least one of the one or more cloud services, the one or more business processes, and the one or more technical processes, in conjunction with at least one of the implemented cloud resources.

An exemplary process utilizing integration adapters 114, cloud services module 116, processes module 118 and integration middleware 120 of the processing platform 106 in information processing system 100 will be described in more detail with reference to the flow diagram of FIG. 8.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a MESOS framework or a CLOUD FOUNDRY Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective DOCKER containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices".

In some embodiments, DOCKER containers or other types of LXCs may be implemented on one or more Linux processing devices using Linux kernel control groups ("cgroups"). However, it is to be appreciated that embodiments of the present invention are not restricted to use with DOCKER containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as DOCKER SWARM or KUBERNETES. Such cluster managers may be implemented within or in association with the cloud-based system 112.

The processing platform 106 can also incorporate one or more container engines, such as one or more DOCKER engines. By way of example, a given DOCKER engine may be preconfigured to run on COREOS, an open source lightweight operating system based on the Linux kernel and particularly configured to provide functionality for deploying applications in containers. Another example of a lightweight operating system suitable for use in implementing at least portions of the processing platform 106 in some embodiments is VMWARE® PHOTON OS™ which has a relatively small footprint and is designed to boot extremely quickly on VMWARE® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE VISION™ Intelligent Operations Software, or other types of management and orchestration components, including components from PIVOTAL CLOUD FOUNDRY, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 9 and 10. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 8.

As detailed herein, cloud resource planning (CRP) can provide integrated multi-cloud management for flexibility in a multi-vendor cloud environment. At least one embodiment of the invention can include providing supply chain-oriented services for cloud product needs of an enterprise, as well as facilitating dynamic and automated processes to allow the enterprise to scale up and/or down from end-user clients, via communication capabilities, and into backend systems. Additionally, one or more embodiments of the invention can include implementing continuous and/or periodic improvements to an enterprise information technology landscape through use of artificial intelligence (AI) and deep learning during technical and business process execution.

Further, in one or more embodiments of the invention, design recommendations and landscape optimizations can be provided by CRP agents based on machine learning techniques (for example, via a recommendations system with smart AI-based agents). As additionally detailed herein, CRP provides frictionless cloud service processes across service providers (open to partners via shared application programming interfaces (APIs) and processes), as well as provides a single management console for technical and business units across an orchestrated cloud landscape.

Enterprise trends can be used to define required features for an implementation by CRP. For example, at least one embodiment of the invention can include implementation of AI and/or machine learning techniques on big data (landscape deployment and operations experience, for example) with forecasting capabilities. Also, one or more embodiments of the invention can include facilitating both an external and an internal perspective on operations.

As noted herein, open interfaces into the CRP platform allow for integration of external services, and therefore forming of new business and technical processes. External services can be plugged-in via an API, and a CRP workflow engine can help to connect the service pieces into a bigger process and enable a flow. Also, in one or more embodiments of the invention, the CRP platform is hardware-agnostic due to a holistic approach, which is independent from specific service providers as well as hardware providers. Core technologies and established practices such as, for example, IT landscape management, monitoring, troubleshooting, security management, and policy execution can be combined and brought onto a single process flow as services. At the same time, the platform is opened to partners and other service providers. In combination with underlying process execution support, one or more embodiments of the invention include enabling multi-provider, multi-cloud service provisioning and optimization of end-user IT processes.

Accordingly, and as further described herein, at least one embodiment of the invention can include automate ad hoc planning and execution of an end-user IT landscape via a CRP platform, wherein such an IT landscape can include one or more cloud services, one or more business processes, and one or more technical processes, in conjunction with available cloud resources. Additionally, as used herein, "ad hoc" planning and execution of an end-user IT landscape refers to a specific end-user selected or designed IT landscape, wherein the end-user is enabled (via the CRP platform) to deploy and/or implement particular cloud services, business process, technical processes and/or cloud resources with the single CRP platform based on the offerings and capabilities of the CRP platform.

Figure 2:
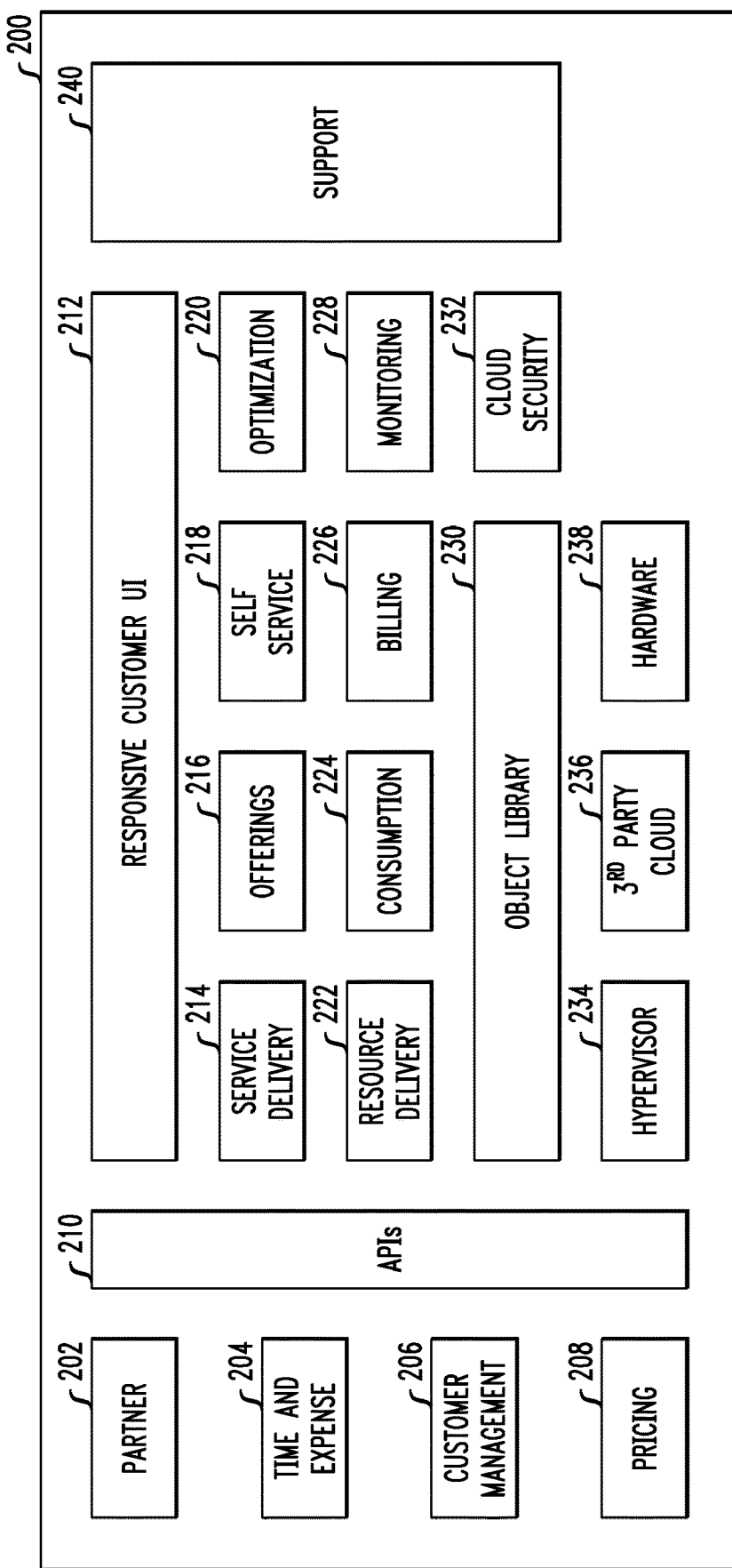
FIG. 2 shows an example cloud resource planning component overview in an illustrative embodiment.

FIG. 2 shows an example cloud resource planning component overview in an illustrative embodiment. By way of illustration, FIG. 2 depicts a CRP platform 200, which includes a partner component 202, a time and expense component 204, a customer management component 206, and a pricing component 208. The platform 200 also includes API componentry 210, a responsive customer user interface (UI) 212, and a support component 240. Further, the platform 200 includes a service delivery component 214, an offerings component 216, a self-service component 218, an optimization component 220, a resource delivery component 222, a consumption component 224, a billing component 226, and a monitoring component 228. Additionally, as depicted in FIG. 2, the CRP platform 200 includes an object library 230, a cloud security component 232, a hypervisor 234, a third party cloud component 236, and a hardware component 238.

As detailed herein, CRP can help an organization compose, execute, monitor, manage and optimize business-related services such as a cloud supply chain, procurement processes, inventory matters, finance matters, service lifecycles, projects, human resources and other components of a service fulfillment through a common dashboard. For example, a cloud service provider can utilize the CRP platform to enable ecosystem integration and leverage core expertise of a partner network for (complex) service composition. Also, in at least one embodiment of the invention, the CRP platform includes a role-dependent view of business and technical aspects of multi-cloud deployments.

Additionally, a customer can utilize the CRP platform, for example, to compose services internally, wherein such services can be enabled to leverage certain external components as business or technical needs dictate. Further, a vendor or independent service provider can utilize the CRP platform, for example, to offer a service or product for use in the platform, wherein such offerings can then be delivered to customers using the platform.

As illustrated in connection with FIG. 1 and also further described herein, one or more embodiments of the invention include a framework that includes incorporating technical services such as enterprise cloud service middleware, implemented business and technical processes, and flexible service module integration and technology utilization. Such a framework can also include a dynamic offering catalog, wherein such an offering catalog includes a service interface to allow for third parties to introduce offerings. The CRP platform can also maintain cross-service metadata pertaining to end-to-end technical and business processes, for example, to establish a consistent service provisioning across independent providers for service modules and technical cloud resources. In at least one embodiment of the invention, the inclusion of a logical cloud composition check supports the compatibility of service modules and consumed cloud resources, and virtual assistance and smart agents help to design comprehensive composed services based on enterprise cloud service design patterns.

Additionally, in one or more embodiments of the invention, the CRP platform provides functions and/or properties such as one or more catalogs, a UI framework, a metadata repository, service registration, and general communication between service providers and end-users/consumers. The framework detailed herein can offer a single entry point in the form of a portal for role-based cloud service consumers and providers, wherein a single business and technical view is created across potentially independent services which rely on potentially dispersed infrastructure resources. Further, and by way of example, the CRP platform can define interfaces such as interfaces for integrating pricing capabilities from pricing engines, interfaces for integrating customer management from CRM systems, and interfaces for integrating billing systems.

Figure 3:
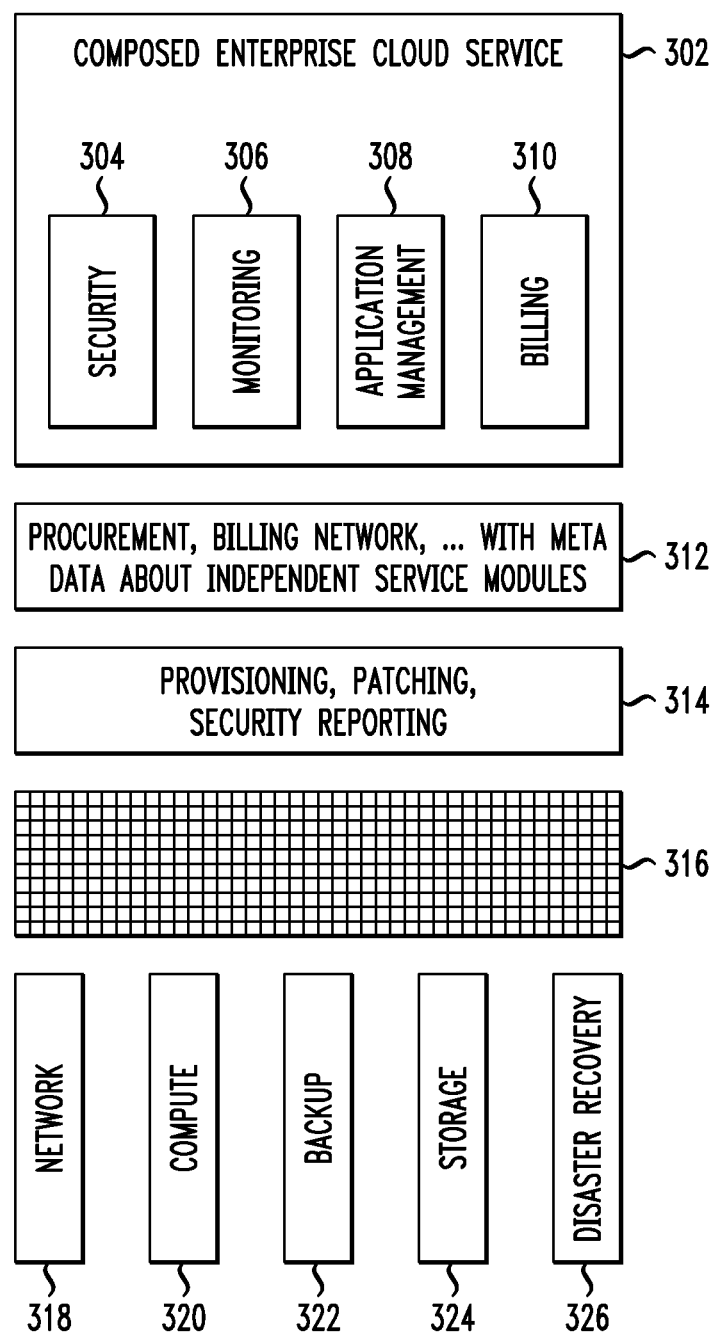
FIG. 3 shows an illustrative embodiment of an information processing system configured for cloud resource planning with multi-provider service composition in an illustrative embodiment.

FIG. 3 shows an illustrative embodiment of an information processing system configured for cloud resource planning with multi-provider service composition in an illustrative embodiment. By way of illustration FIG. 3 depicts a composed enterprise cloud service 302 which includes independent service modules 304 (a security service module), 306 (a monitoring service module), 308 (an application management service module), and 310 (a billing service module). Additionally, FIG. 3 depicts a business processes component 312, which can encompass business processes such as procurement, billing, network capabilities, etc., and which compiles metadata pertaining to the independent service modules 304, 306, 308 and 310. FIG. 3 also depicts a technical processes component 314, which can encompass technical processes such as provisioning, patching, security reporting, etc.

As also illustrated, FIG. 3 depicts technical integration adapters for technical resources, such as a network integration adapter 318, a computation integration adapter 320, a backup integration adapter 322, a storage integration adapter 324, and a disaster recovery integration adapter 326. Such technical integration adapters can enable efficient interaction with a multi-provider and multi-technology setup. As detailed in FIG. 3, interfaces to IT services such as, for example, compute, network and storage provisioning can be deployed in a structured and open interface style to allow for a wide ecosystem and business system integration.

FIG. 3 also depicts a service integration middleware 316, which serves as a bridge between the independent service modules, the business processes, the technical processes and integration adapters for technical resources. The service integration middleware 316 also facilitates communication and data management for the distributed services and processes across the CRP platform. Specifically, the service integration middleware 316 enables integration with multiple different underlying cloud technologies by allowing different modules from different providers to interact seamlessly via the CRP platform, even when those modules are functionally similar. For example, interactions between several different computation integration adapters (320) from several different providers (AWS, VMWARE, etc.) can be integrated to service integration middleware 316 in a way that for technical processes component 314, those adapters present effectively the same behavior. Accordingly, one or more embodiments of the invention can include implementing and utilizing multiple different adapters; for example, one adapter for each function of each cloud.

Figure 4:
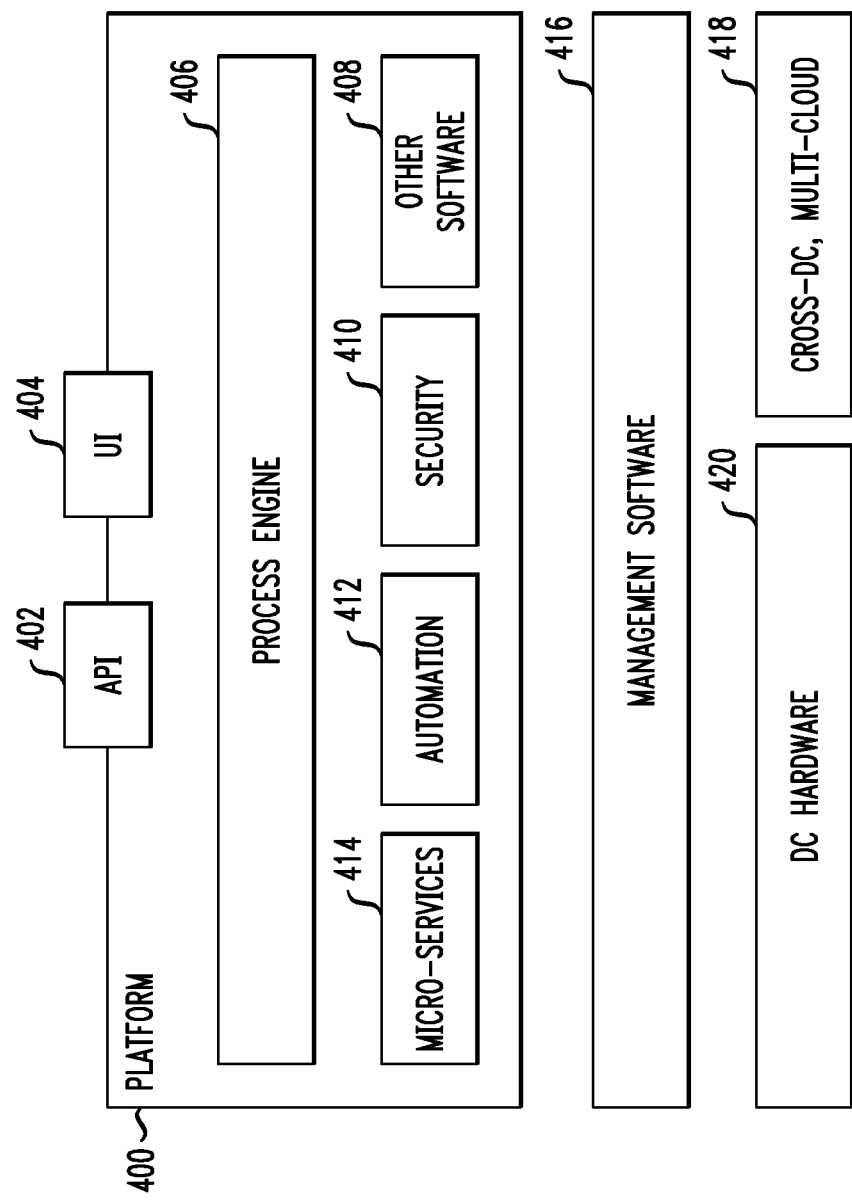
FIG. 4 shows cloud resource planning architecture in an illustrative embodiment.

FIG. 4 shows cloud resource planning architecture in an illustrative embodiment. By way of illustration, FIG. 4 depicts a CRP platform 400, which includes an API 402 and UI 404 for interaction with users. Additionally, the platform 400 includes a process engine 406 (which can incorporate AI functionality), a micro-services component 414, an automation component 412, a security component 410, and other software 408. FIG. 4 also depicts management software 416, data center (DC) hardware componentry 420, and cross-DC, multi-cloud componentry 418. The management software 416 can include low-level data center operations software, such as maintenance (patching, updating, upgrading), monitoring, auto-discovery, and software-defined-everything components. Such management software 416 can be hardware- and/or data center-specific, and therefore not part of the platform (as different servers can have different management software pieces with which they interact). As such, the management software 416 can communicate with the DC hardware 420 via one or more APIs and provide information (such as health status, general availability, etc.) about the DC hardware 420 up to the platform 400.

The cross-DC, multi-cloud componentry 418 facilitates platform communication between data centers, such as direct virtual private network (VPN) tunnels or multiprotocol label switching (MPLS) circuits. Via the multi-cloud aspect of component 418, the platform 400 can interact with a variety of types of clouds.

As illustrated in FIG. 4, at least one embodiment of the invention can include combining micro-services 414, automation components 412, security components 410, and other (standard off-the-shelf) software 408 into comprehensive value-creating processes. In one or more embodiments of the invention, AI-components in the process engine 406 allow for smart process execution, internally and externally. For example, CRP processes can include multi-cloud deployment optimization, as well as total cloud supply chain optimization. Such cloud supply chain optimization can include, for example, enhancing the supply chain by recommending new components, suppliers, etc.

Accordingly, via at least one embodiment of the invention, enterprise partners, suppliers and customers can experience the CRP platform as a one-stop portal for cloud products and the related lifecycle management of (complex) orchestrated landscapes. As detailed herein, customers can experience a cohesive monitoring and management plane for an entire IT landscape, with the CRP platform providing financial and technical views, as well as customer-specific optimization of IT-supported business. Also, a CRP platform can unite existing enterprise resource planning (ERP), customer relationship management (CRM), supply chain management (SCM), procurement, monitoring and customer support systems onto a single data and process plane.

As additionally detailed herein, in one or more embodiments of the invention, CRP-related IT tooling (such as data gathering, provisioning, troubleshooting, etc.) is hardware agnostic, and service support tools for provisioning and lifecycle support are infrastructure-independent. Similarly, in at least one embodiment of the invention, a CRP platform can support various cloud service deployment platforms and related infrastructure via APIs and vendor-provided plug-ins.

Further, one or more embodiments of the invention can include facilitating, via the CRP platform, scaling a business and related applications and services on-demand up or down across multi-cloud and multi-service environments. Such an embodiment can include implementing end-to-end process support via artificial intelligence, including functionality such as selecting optimal vendors, products and/or contracts, and suggesting collaboration partners from different and/or similar industries. Also, in one or more embodiments of the invention, a CRP platform can encompass the use of one or more legacy applications, software as a service (SaaS), infrastructure as a service (IaaS), platform as a service (PaaS), integration, on premise software, etc.

Figure 5:
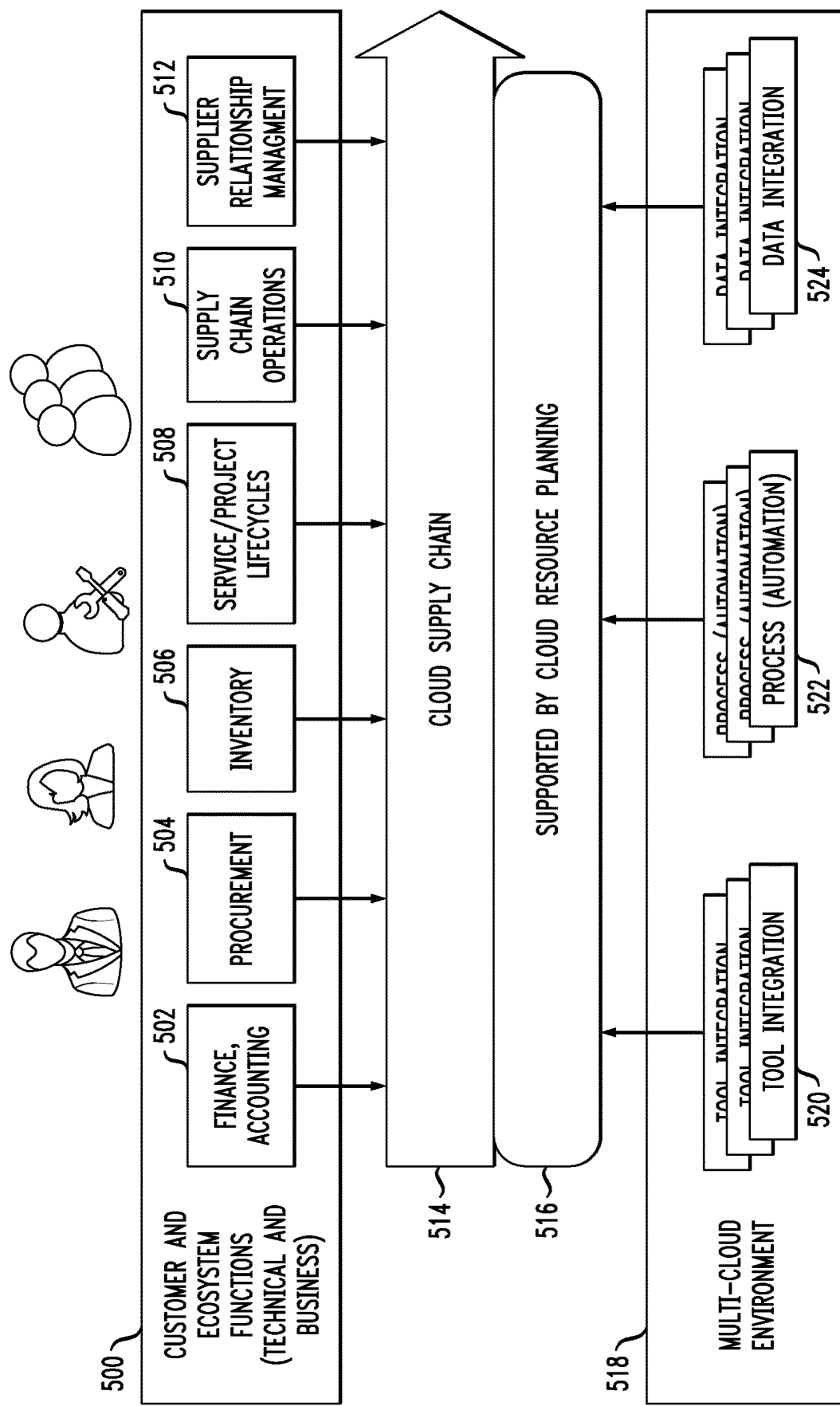
FIG. 5 shows supply chain aspects of cloud resource planning in another illustrative embodiment.

FIG. 5 shows supply chain aspects of cloud resource planning in another illustrative embodiment. By way of illustration, FIG. 5 depicts a collection of example customer and ecosystem functions 500 such as finance and accounting functions 502, procurement functions 504, inventory functions 506, service and/or project lifecycle functions 508, supply chain operations 510, supplier relationship management functions 512, etc. Such functions 500 are incorporated into a cloud supply chain 514, which can be supported by a CRP platform 516. Specifically, the CRP platform 516 can help an organization compose, execute, monitor, manage and optimize its cloud supply chain 514, as well as procurement, inventory, finance, service lifecycle, projects, human resources and other components of a service fulfillment through a common dashboard. The CRP platform 516 can serve as a service entry point for business and technical enterprise roles, integrating the customer and ecosystem functions 500 with tools 520, automated processes 522, and data 524 from a multi-cloud environment 518. Such a multi-cloud environment 518 can include, for example, an enterprise cloud and one or more public clouds.

Figure 6:
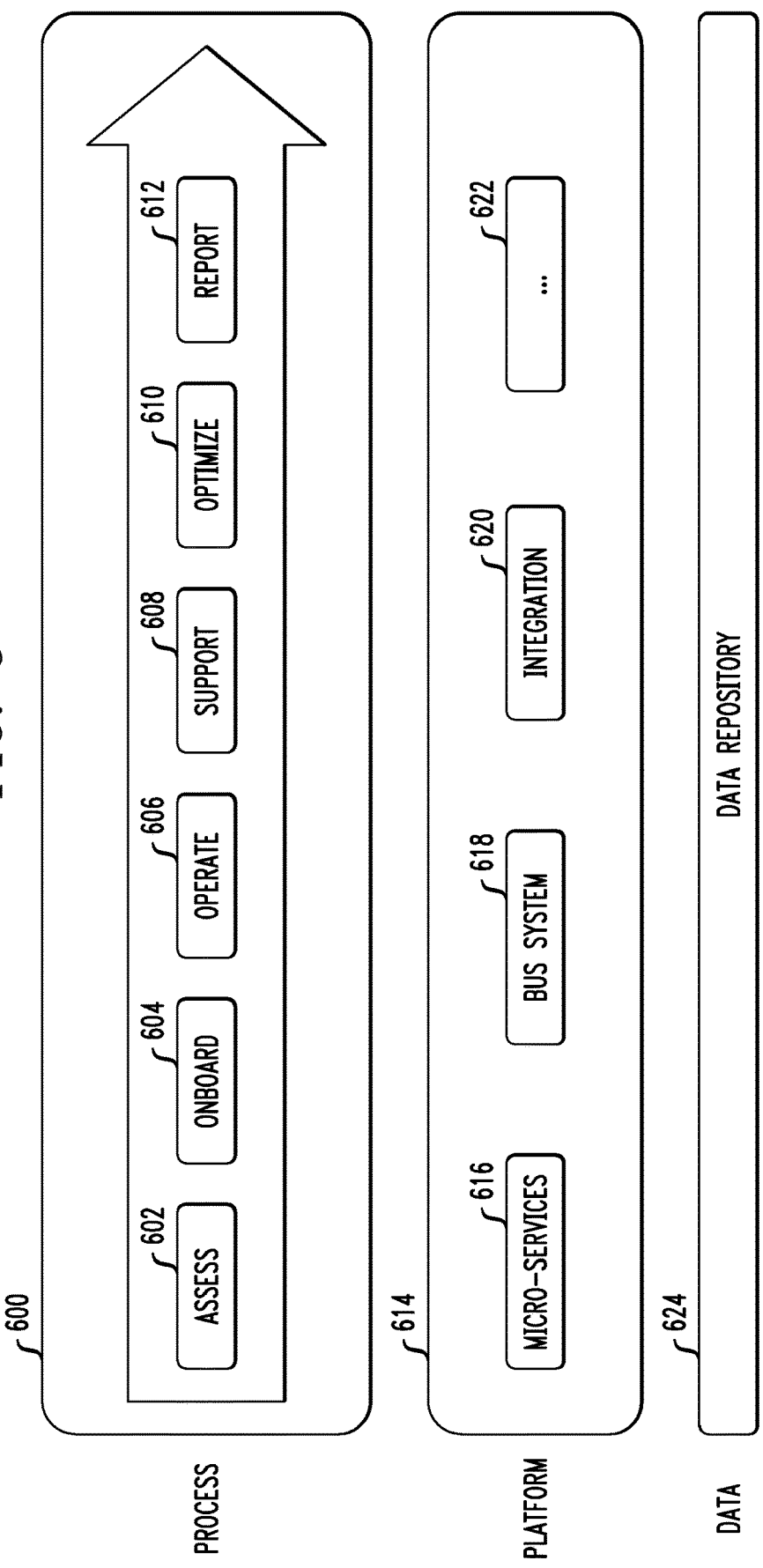
FIG. 6 shows a system view of cloud resource planning in an illustrative embodiment.

FIG. 6 shows a system view of cloud resource planning in an illustrative embodiment. By way of illustration, FIG. 6 depicts a process layer 600, a platform layer 614, and a data layer 624. The process layer 600, which can include, for example, an assessment process 602, an onboarding process 604, an operation process 606, a support process 608, an optimization process 610, and a reporting process 612, can carry out intelligent process handling via automation. The platform layer 614 can include micro-services 616, communication via a bus system 618, a full tool landscape integration 620, and one or more additional components 622. Further, as illustrated, the data layer 624 can include a data repository (from across the supply chain, for example) derived from one or more systems and smart agents.

The platform layer 614 can also allow for catalog functions, which enable an enterprise to select one or more service providers based on capability, rating, successful deployments, etc. In one or more embodiments of the invention, such a catalog of offerings is compliant with one or more enterprise parameters and/or requirements, and allows for the enterprise to selectively show offerings based on one or more end-customer attributes. Such offerings can be priced by allowing pricing engines to perform pricing in real-time via a service interface. Additionally, as detailed herein, similar to service modules, the usage of technical integration adapters for cloud resources can be catalog-based and ensure compatibility across a service fulfillment. In at least one embodiment of the invention, a logical cloud service check ensures that the technical and business processes across the service provisioning cycle can be supported by the chosen service modules, and as that they are supported by the chosen cloud resources as integrated through the technical adapters.

Referring now to FIG. 7, another illustrative embodiment is shown. In this embodiment, pseudocode 700 is executed by or under the control of a processing platform, such as processing platform 106, or another type of processing platform. For example, the pseudocode 700 may be viewed as comprising a portion of a software implementation of at least part of integration middleware 120 of the FIG. 1 embodiment.

The pseudocode 700 illustrates an example definition of a CRP service, here a virtual machine, which can be incorporated into a larger supply chain to form a comprehensive IT landscape. The pseudocode 700 illustrates a general class definition of a CRP service and also includes a constructor for a virtual machine service, including name, description, price and address. Also, the pseudocode 700 illustrates a workflow schema for incorporating such a CRP service virtual machine into an overall process flow and indicates a daily optimization of the virtual machine. The inclusion into a process flow works via triggers, actions, and output parameters.

It is to be appreciated that this particular pseudocode shows just one example implementation of a process for service and workflow definition, and alternative implementations of the process can be used in other embodiments.

As noted herein, the operation of the information processing system 100 is described in further detail with reference to the flow diagram of the example embodiment of FIG. 8. The process as shown includes steps 800 through 810, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 800, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 802, at least a portion of at least a first cloud-based system is implemented within the processing platform. For example, with reference to the FIG. 1 embodiment, virtual resources 110 of cloud-based system 112 are implemented within the processing platform 106. As mentioned previously, such virtual resources (or such a portion of a cloud-based system) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 804, multiple cloud resources are implemented onto the processing platform. Such a step can be carried out, for example, by integration adapters 114 in the FIG. 1 embodiment. The cloud resources can include, for example, one or more network resources, one or more computation resources, one or more backup resources, one or more storage resources, and/or one or more disaster recovery resources.

In step 806, one or more identified cloud services are deployed onto the processing platform. Such a step can be carried out, for example, by cloud services module 116 in the FIG. 1 embodiment. The identified cloud services can include, for example, one or more security services, one or more monitoring services, one or more application management services, and/or one or more billing services.

In step 808, one or more identified business processes and one or more identified technical processes are deployed onto the processing platform. Such a step can be carried out, for example, by processes module 118 in the FIG. 1 embodiment. The identified business processes can include, for example, one or more procurement processes and/or one or more billing processes. The identified technical processes can include, for example, one or more provisioning processes, one or more patching processes, and/or one or more reporting processes.

In step 810, ad hoc execution of at least one of the one or more cloud services, the one or more business processes, and the one or more technical processes is automated, in conjunction with at least one of the implemented cloud resources. Such a step can be carried out, for example, by integration middleware 120 in the FIG. 1 embodiment. At least one embodiment of the invention can also include enabling ad hoc planning of an information technology landscape across multiple data center targets and executing the planned information technology landscape. Such steps can be carried out, for example, by the integration middleware 120 in the FIG. 1 embodiment. Additionally, one or more embodiments of the invention can include analyzing the executed information technology landscape against one or more performance indicators, and automatically improving, based on the analysis against the one or more performance indicators, the executed information technology landscape across at least one of one or more multi-cloud deployment options.

As also detailed herein, at least one embodiment of the invention can include enabling flexible selection, by an end-user, of any of the one or more cloud services, the one or more business processes, the one or more technical processes, and the implemented cloud resources. Such a step can be carried out, for example, by the integration middleware 120 in the FIG. 1 embodiment. The techniques depicted in FIG. 8 can also include generating and outputting a unified view of the cloud services, the business processes, the technical processes, and the cloud resources on the processing platform. Such steps can be carried out, for example, by the integration middleware 120 in the FIG. 1 embodiment. Further, one or more embodiments of the invention can include determining compatibility of the one or more cloud services and consumption of the implemented cloud resources, as well as facilitating communication between one or more providers and the cloud services and end users of the processing platform. Such steps can be carried out, for example, by the integration middleware 120 in the FIG. 1 embodiment.

The techniques depicted in FIG. 8 can also include composing (for example, via a virtual assistance design module) one or more combinations of the cloud services based on one or more cloud service design patterns. Additionally, one or more embodiments of the invention can include maintaining (for example, via a metadata repository) cross-cloud service metadata related to the one or more business processes and the one or more technical processes. Also, at least one embodiment of the invention can include integrating, via one or more interfaces, one or more pricing functions from one or more pricing engines as well as customer management information from one or more customer relationship management systems.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of delivering enterprise cloud resources and services using composable business and technical processes as disclosed herein can provide a number of significant advantages relative to conventional arrangements.

For example, some embodiments can advantageously allow business and technical services to be integrated into a common framework to deliver and orchestrate end-to-end cloud service processes for enterprises. Also, one or more embodiments can support business process execution and a tight mapping of technical and business requirements.

Such arrangements overcome the difficulties that would otherwise be associated with existing approaches limited to focusing on single aspects of an enterprise's cloud platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft AZURE. Virtual machines provided in such systems can be used to implement at least portions of one or more of a computer system and a content addressable storage system in illustrative embodiments. These and other cloud-based systems in illustrative embodiments can include object stores such as Amazon S3, GCP CLOUD STORAGE, and Microsoft AZURE Blob Storage.

In some embodiments, the cloud infrastructure additionally or alternatively comprises a plurality of containers implemented using container host devices. For example, as detailed herein, a given container of cloud infrastructure illustratively comprises a DOCKER container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
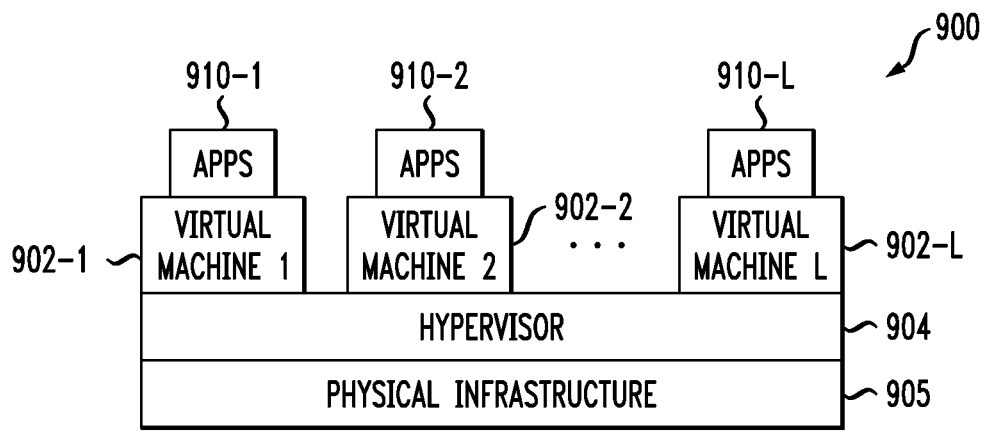
FIGS. 9 and 10 show examples of processing platforms that may be utilized to implement at least a portion of an information processing system in illustrative embodiments.
Figure 10:
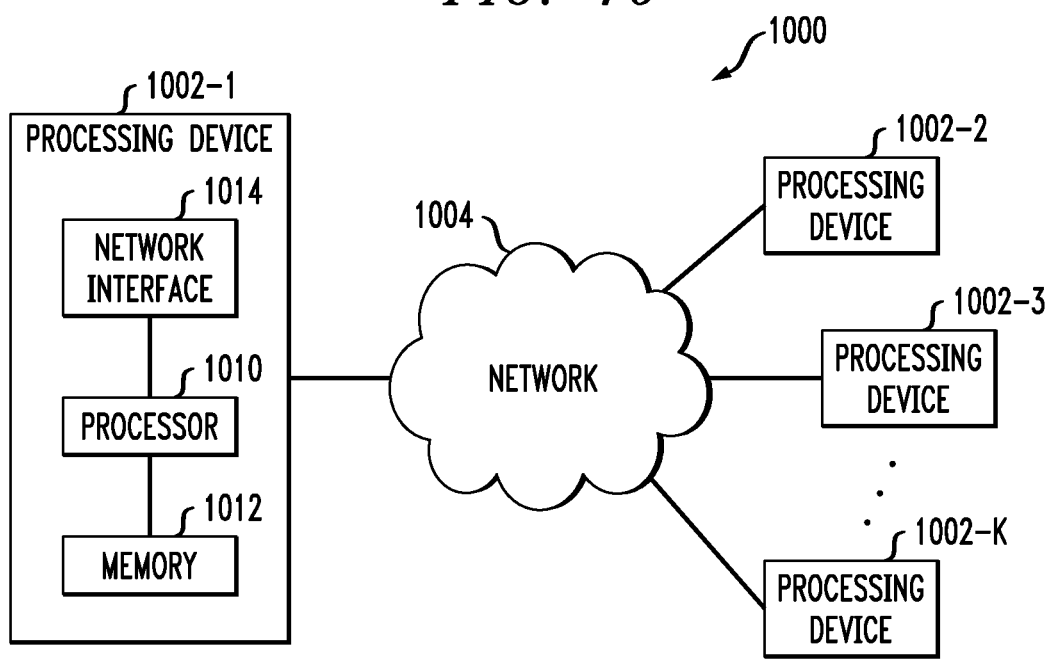

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMWARE® VSPHERE® which may have an associated virtual infrastructure management system such as the VMWARE® VCENTER™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WI-FI or WIMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide DOCKER containers or other types of LXCs.

As another example, portions of a given processing platform in some embodiments can comprise converged infrastructure such as VXRAIL™, VXRACK™, VXBLOCK™, or VBLOCK® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and SYMMETRIX VMAX® storage arrays, software-defined storage products such as SCALEIO™ and VIPR®, all-flash and hybrid flash storage arrays such as UNITY™, cloud storage products such as Elastic Cloud Storage ELASTIC CLOUD STORAGE (ECS), object-based storage products such as ATMOS®, scale-out all-flash storage arrays such as XTREMIO™, and scale-out NAS clusters comprising ISILON® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide enterprise cloud resources and services using composable business and technical processes. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
at least one processing platform comprising a plurality of processing devices each comprising a processor coupled to a memory;
the processing platform being configured to implement at least a portion of at least a first cloud-based system;
wherein the processing platform is configured:
to implement multiple cloud resources onto the processing platform;
to deploy one or more cloud services onto the processing platform;
to deploy one or more business processes and one or more technical processes onto the processing platform;
to determine one or more modifications to an information technology environment associated with the processing platform by processing, using one or more machine learning techniques, data pertaining to at least one of information technology environment information, cloud services operation information, and one or more end-user attributes of at least one end-user, wherein the one or more modifications are related to automated selections of one or more vendors, one or more products, one or more contracts, and one or more collaboration partners from one or more industries; and
to automate ad hoc execution of at least one of the one or more cloud services, the one or more business processes, and the one or more technical processes, in conjunction with at least one of the implemented cloud resources, wherein automating ad hoc execution comprises enabling platform communication between multiple data centers via at least one of one or more direct virtual private network tunnels and one or more multiprotocol label switching circuits.

2. The apparatus of claim 1, wherein the processing platform is further configured to:
enable ad hoc planning of the information technology environment, based at least in part on the one or more determined modifications, across multiple data center targets; and
execute the planned information technology environment.

3. The apparatus of claim 2, wherein the processing platform is further configured to:
analyze the executed information technology environment against one or more performance indicators; and
automatically improve, based on the analysis against the one or more performance indicators, the executed information technology environment across at least one of one or more multi-cloud deployment options.

4. The apparatus of claim 1, wherein the processing platform is further configured to enable flexible selection, by the at least one end-user, of any of the one or more cloud services, the one or more business processes, the one or more technical processes, and the implemented cloud resources.

5. The apparatus of claim 1, wherein the processing platform is further configured to generate and output a unified view of the one or more cloud services, the one or more business processes, the one or more technical processes, and the implemented cloud resources on the processing platform.

6. The apparatus of claim 1, wherein the processing platform is further configured to determine compatibility of the one or more cloud services and consumption of the implemented cloud resources.

7. The apparatus of claim 1, wherein the processing platform is further configured:
to compose one or more combinations of the one or more cloud services based on one or more cloud service design patterns.

8. The apparatus of claim 1, wherein the processing platform further comprises:
a metadata repository configured to maintain cross-cloud service metadata related to the one or more business processes and the one or more technical processes.

9. The apparatus of claim 1, wherein the processing platform is further configured to facilitate communication between one or more providers and the one or more cloud services and end users of the processing platform.

10. The apparatus of claim 1, wherein the processing platform further comprises:
a pricing interface configured to integrate one or more pricing functions from one or more pricing engines.

11. The apparatus of claim 1, wherein the processing platform further comprises:
a customer management interface configured to integrate customer management information from one or more customer relationship management systems.

12. The apparatus of claim 1, wherein the multiple cloud resources comprise at least one of one or more network resources, one or more computation resources, one or more backup resources, one or more storage resources, and one or more disaster recovery resources.

13. The apparatus of claim 1, wherein the one or more cloud services comprise at least one of one or more security services, one or more monitoring services, one or more application management services, and one or more billing services.

14. The apparatus of claim 1, wherein the one or more business processes comprise at least one of one or more procurement processes and one or more billing processes.

15. The apparatus of claim 1, wherein the one or more technical processes comprise at least one of one or more provisioning processes, one or more patching processes, and one or more reporting processes.

16. The apparatus of claim 1, wherein the at least a portion of at least a first cloud-based system comprises at least one of a plurality of virtual machines and a plurality of containers configured to run on at least a subset of the virtual machines.

17. A method comprising steps of:
implementing multiple cloud resources onto a processing platform;
deploying one or more cloud services onto the processing platform;
deploying one or more business processes and one or more technical processes onto the processing platform;
determining one or more modifications to an information technology environment associated with the processing platform by processing, using one or more machine learning techniques, data pertaining to at least one of information technology environment information, cloud services operation information, and one or more end-user attributes of at least one end-user, wherein the one or more modifications are related to automated selections of one or more vendors, one or more products, one or more contracts, and one or more collaboration partners from one or more industries; and
automating ad hoc execution of at least one of the one or more cloud services, the one or more business processes, and the one or more technical processes, in conjunction with at least one of the implemented cloud resources, wherein automating ad hoc execution comprises enabling platform communication between multiple data centers via at least one of one or more direct virtual private network tunnels and one or more multiprotocol label switching circuits;
wherein the implementing, deploying, and automating steps are implemented in the processing platform configured to include a plurality of processing devices each comprising a processor coupled to a memory; and
wherein the processing platform is configured to implement at least a portion of at least a first cloud-based system.

18. The method of claim 17, further comprising:
enabling ad hoc planning of the information technology environment, based at least in part on the one or more determined modifications, across multiple data center targets;
executing the planned information technology environment;
analyzing the executed information technology environment against one or more performance indicators;
automatically improving, based on the analysis against the one or more performance indicators, the executed information technology environment across at least one of one or more multi-cloud deployment options.

19. A computer program product comprising a non-transitory processor-readable storage medium having stored therein program code of one or more software programs, wherein the program code when executed by a processing platform comprising a plurality of processing devices causes the processing platform:
to implement multiple cloud resources onto the processing platform;
to deploy one or more cloud services onto the processing platform;
to deploy one or more business processes and one or more technical processes onto the processing platform;
to determine one or more modifications to an information technology environment associated with the processing platform by processing, using one or more machine learning techniques, data pertaining to at least one of information technology environment information, cloud services operation information, and one or more end-user attributes of at least one end-user, wherein the one or more modifications are related to automated selections of one or more vendors, one or more products, one or more contracts, and one or more collaboration partners from one or more industries; and to automate ad hoc execution of at least one of the one or more cloud services, the one or more business processes, and the one or more technical processes, in conjunction with at least one of the implemented cloud resources, wherein automating ad hoc execution comprises enabling platform communication between multiple data centers via at least one of one or more direct virtual private network tunnels and one or more multiprotocol label switching circuits;

wherein the processing platform is configured to implement at least a portion of at least a first cloud-based system.

20. The computer program product of claim 19, wherein the program code further causes the processing platform:

to enable ad hoc planning of the information technology environment, based at least in part on the one or more determined modifications, across multiple data center targets;

to execute the planned information technology environment;

to analyze the executed information technology environment against one or more performance indicators;

to automatically improve, based on the analysis against the one or more performance indicators, the executed information technology environment across at least one of one or more multi-cloud deployment options.

* * * * *